Figure 1:
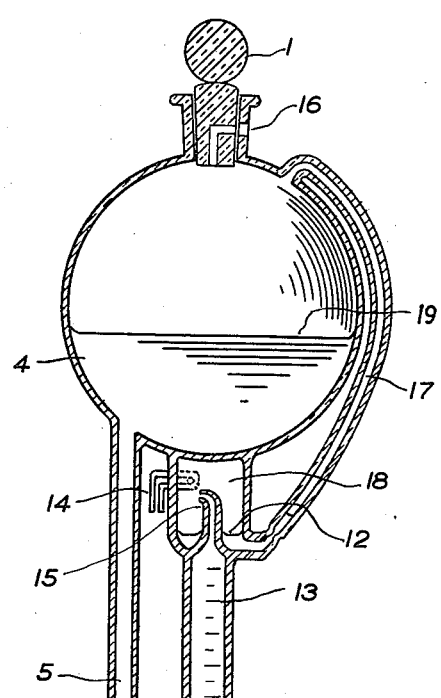

Aug. 10, 1937.   O. HOPF ET AL   2,089,796
VOLUMETRIC APPARATUS
Filed May 6, 1935

Otto Hopf
Frederick A. Wenman.
INVENTORS.

BY
*A. Mutscheller* ATTORNEY.

Patented Aug. 10, 1937

2,089,796

UNITED STATES PATENT OFFICE 2,089,796

VOLUMETRIC APPARATUS

Otto Hopf, New York, and Frederick A. Wenman, Brooklyn, N. Y., assignors to Richard Schnier, Beechhurst, L. I., N. Y.

Application May 6, 1935, Serial No. 19,998

10 Claims. (Cl. 23—259)

This invention relates to an improved form of volumetric apparatus in which the process of refilling the graduated vessel is carried out according to a novel method through which many valuable advantages over similar types of apparatus of this kind used heretofore are accomplished. After every emptying of the measuring vessel the refilling process is carried out with a single operation and thereby a considerable saving in time and complete avoidance of spilling or otherwise wasting of solution are secured.

A volumetric vessel as is herein to be understood is a carefully calibrated glass tube or vessel such as is ordinarily used in chemical laboratories for volumetric analysis or the measuring out of definite volumes of fluid or solution. Therefore, such a volumetric vessel may be a burette or a cylindrical glass tube graduated to indicate the volume of solution delivered between the changes of the level before and after the outflow. Or, such a volumetric vessel may be an elongated, a cylindrical or a spherical bulb with two constricted ends which are marked to indicate the volume of fluid contained between these marks; such a vessel in the chemical language is known as a pipette and it serves for measuring out with each emptying a definite volume of fluid or of solution.

The refilling of a burette especially when a great many measurements are to be made or when a burette should at any time be ready for use brings about a number of difficulties which we have overcome and eliminated, as becomes apparent during the reading of the following specification. But principally, we have accomplished a much simpler construction and operation, an easy method of cleaning, a minimum of stopcocks, no valves, no rubber parts and the solution can be protected more readily and simply against evaporation or in general against contamination by dust or through contact with the atmospheric air.

In a burette of our invention the upper part of the burette is provided with a constricted nozzle-like overflow portion terminating and reaching into an overflow vessel. From as near the bottom as possible of this overflow vessel, a small diameter tube connects with the upper part of the storage vessel and when a sufficiently large difference of air pressure is produced between the level of the fluid in the overflow vessel and in the storage vessel, then the excess fluid in the overflow vessel will be transported from there to the storage vessel. This performance is generally improved by making a slight constriction in the diameter of the tube a short distance from the place where it is sealed into the overflow vessel. This process is carried out on the principle of the hydraulic press and is more fully described further on.

The nozzle-like portion above referred to is for the double purpose of first effecting a complete filling of the burette by simply filling it by gravity until the nozzle overflows, and second to reach sufficiently far into the overflow vessel that the level of the excess fluid can rise to an appreciable height before reaspiration of fluid into the burette could take place. This performance is obtained under the conditions and space relations explained further on.

The difference of air pressure referred to can be produced in one of two ways. Either the storage vessel is closed and the overflow vessel is kept open to the atmosphere and then when fluid is withdrawn from the storage vessel through filling of the burette, there is produced in the storage vessel a corresponding degree of vacuum or reduced pressure while the pressure on the fluid level in the overflow vessel and in the burette remains that of the atmosphere; or, if the storage vessel is open and the overflow vessel is closed to the atmosphere, there is produced in the overflow vessel an increase of air pressure when during the filling of the burette the air contained in it is compressed into the overflow vessel. In the storage vessel, however, there remains atmospheric pressure. Our burette can, therefore, be operated in either one or the other of these two ways.

Figure 3:
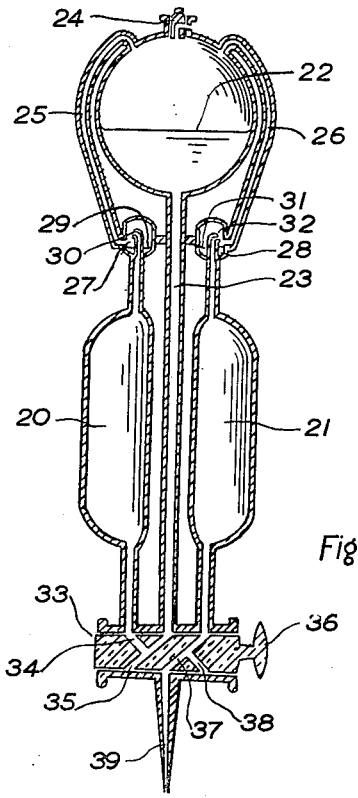
Figure 2:
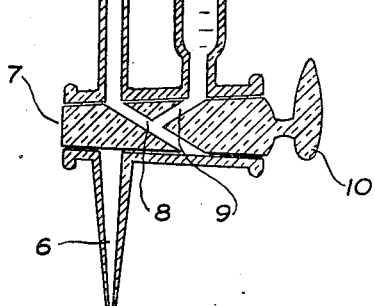

Fig. 1 is a cross-section of a burette of our design and Fig. 2 is also a cross-section of the stopcock with the cock rotated through 180°. Fig. 3, also a cross-section, shows a double pipette which is for measuring out uniform volumes of fluid or of solution in rapid succession.

In Fig. 1, 4 is a storage vessel for the fluid or solution to be used for the filling of the burette 11. This burette is filled by turning the stopcock 7 by means of handle 10 into the position shown and through which the fluid in the storage vessel 4 can flow through the tube 5, passing through the bore 8 and the bore 9 in the stopcock 7 to enter the burette 11. The fluid will ascend by gravity into the burette until the overflow nozzle 15 is filled and some fluid 12 will accumulate in the overflow vessel 18. If then the stopcock 7 is turned until it is in the position shown in Fig. 2, the filling process is interrupted and the fluid contained in the burette flows out through the tip 6. By turning the stopcock 7 into an intermediate position between those shown in Fig. 1 and Fig. 2 either the filling or the emptying process is interrupted.

The overflow vessel 18 has a small bore connecting tube 17 sealed into near the bottom so that a small amount of fluid contained in the overflow vessel is sufficient to close the tube 17. This connecting tube terminates into the upper portion of the storage vessel 4 and thus any excess fluid contained in the overflow vessel 18, such as that shown as 12, can be transported back into the storage vessel by creating a sufficient amount of pressure difference upon the fluid levels 12 and 19 as is to be explained further on.

At its highest place the overflow vessel 18 has a tube 14 sealed into it by means of which the overflow vessel can be either kept open to the atmosphere or closed as desired. This tube is also useful for cleaning of the apparatus. It is conveniently closed with a rubber cap or a glass stopper.

The uppermost part of the storage vessel 4 has an opening to be closed with the stopper 15 serving for the purpose of filling and closing the storage vessel 4 with fluid or solution. This stopper 15 has a bore which when in proper position communicates with the opening 16 and thus the fluid level 19 is in direct contact with the normal outside atmospheric air pressure. A partial turn of stopper 15 closes the vessel.

In Fig. 1, the volumetric vessel is a burette of the conventional type having graduations 13 for the purpose well understood in chemistry. In Fig. 3, a similar apparatus is shown embodying two pipettes 20 and 21 and thus a multiplication of the volumetric apparatus arranged and correlated for the purpose of obtaining the filling of one pipette while the other is emptying its measured content.

Thus the overflow vessels 27 and 28, the connecting tube 25 and 26 and the overflow nozzles 30 and 32 are similar in construction and arrangement to those parts shown in Fig. 1.

The stopcock 33 has a handle 36 and two sets of bores as those of stopcock 7 of Fig. 1 and Fig. 2. These are so correlated that a turn of 180° changes one pipette from being in filling relation with the storage vessel 22 through the tube 23 to the emptying position. The other pipette performs the same functions but in reversed order.

This multiple form of volumetric apparatus is particularly useful for rapid filling and liquid dispensing operations and the rapid placing of uniform volumes of a reagent into a large number of test vessels or if instead of two pipettes two burettes are provided as shown in single arrangement in Fig. 1, a continuous titrating operation without interruption caused by refilling of the burette is feasible.

Assuming now that it is desired to operate the burette on the pressure principle or when the storage vessel is open and the overflow vessel is closed to the atmosphere, then stopcock 15 is turned to the position shown in Fig. 1 when the bore is in a communicating position with the opening 16 and the tube 14 is closed.

When the stopcock 7 is in the position shown in Fig. 1, then the fluid in the storage vessel 4 will descend through the tube 5, pass through the passages 8 and 9 in the stopcock 7 and ascend into the burette 11 until the fluid level fills the nozzle 15. The air originally contained in the burette 11 is thereby displaced and compressed in the overflow vessel 18 and if there is any fluid as that shown by the level 12, it will be pushed up through the tube 17 and emptied into the storage vessel 4. It is to be noted, that the fluid level 12 has a very much larger area than the tube 17 and thus, in accordance with Pascal's principle, a relatively large fluid level rise in the tube 17 is so obtained. It is, however, required that the size of the overflow vessel in relation to the volume of the burette be such, that filling of the burette with fluid produces the pressure required to displace the fluid in tube 17 as described.

Moreover, after the burette is completely filled and the excess fluid 12 is returned to the storage vessel 4, there is normally again overflowing of fluid through the nozzle 15. Thereby the tube 17 becomes closed with fluid or solution and while the fluid level in the overflow vessel rises, there is again developed a pressure until it is equal to the difference of gravity pressure between the two fluid levels 12 and 19. Then the ascent of fluid stops and no further filling of the overflow vessel takes place. By properly relating the size of the overflow vessel to the highest possible fluid level difference, an overflowing or rising of fluid above the nozzle 15 is prevented. In practice, therefore, the stopcock 7 is turned into the position shown in Fig. 1 and the burette fills completely to the top of the nozzle 15, a small amount of fluid overflows and the process then stops automatically.

When the stopcock 7 is turned into the position shown in Fig. 2, the fluid flows out through the tip 6 and either a titrating process can be carried out in the well-known manner or the fluid can be emptied completely into a test vessel. Returning the stopcock 7 again into the position shown in Fig. 1, causes again refilling of the burette as already described.

But assuming that the burette should be operated on the vacuum principle, then the stopper 1 is closed and the tube 14 is opened. Filling of the burette produces then a partial vacuum in the storage vessel 4 above the fluid level 19; in the overflow vessel 18 there remains atmospheric pressure and any excess fluid contained in the tube 17 will be aspirated or sucked up into the storage vessel. Again during the filling of the burette there may be overflowing of fluid through the nozzle 15 and the tube 17 is closed with fluid and again a vacuum is produced in the storage vessel 4 which will prevent a further fluid level rise in the overflow vessel 18 above the level of the outflow nozzle 15.

In both cases of pressure or vacuum operation, the air pressure difference developed during the filling of the burette is quite large relatively to be sufficient to draw the fluid in the overflow vessel 18 and the tube 17 up into the storage vessel. But when the burette is completely filled, a relatively smaller pressure difference develops which does not cause emptying of the vessel 18 and tube 17, but which is just sufficient to prevent further filling of the overflow vessel 18.

It is to be noted, that there is an intake of air only through the opening 16 when the burette operates on the pressure principle, or through tube 14 when it operates on the vacuum principle. If solutions are such that contact with air might contaminate to cause change of titre, it is feasible to add there suitable air filtering or washing devices such as calcium chloride or soda lime etc. tubes and then the burette can be left standing being constantly ready for use. But the stopper 1 can be given a half turn to close the opening 16 and the solution is then well protected when not being used.

In some instances the storage vessel 19 instead of being an integral part of the burette, may be a separate vessel either rigidly or flexibly connected with the burette. In that case and when several burettes are connected with one storage vessel, the operation on the pressure principle might prove advantageous.

The double pipette Fig. 3, is shown to operate on the pressure principle, and therefore, the tube 14 is omitted. With the stopcock 33 in the position shown, the pipette 20 is filling in the manner described and the pipette 21 is emptying through the tip 39. Giving the stopcock 33 a turn of 180° by means of the handle 36, causes the pipette 21 to fill and pipette 20 to empty.

Having thus described one specific form of a burette and one practical form of further application, we do not limit ourselves to these specific details but to the general principle of the invention which is expressed in the claims.

We claim:

1. In a volumetric measuring vessel having an overflow tip and an overflow vessel, a main storage tank having a connecting tube for filling said measuring vessel, means for producing automatically during the filling of said measuring vessel a pressure difference between the fluid level in said overflow and said storage vessels and means, through said pressure difference, to force any overflow fluid from said overflow vessel into said storage vessel.

2. In a volumetric measuring apparatus having a storage vessel for reaction fluid and connected to a measuring vessel, said measuring vessel having an overflow tip terminating in an overflow vessel, means for creating during the filling of said measuring vessel a pressure difference between the fluid levels in said overflow vessel and said storage vessel sufficient to stop further overflowing through said overflow tip before said tip becomes submersed in overflow fluid, said pressure difference being created automatically during the refilling of said measuring vessel with fluid from said storage vessel and overflowing through said overflow tip.

3. In a volumetric measuring apparatus having an overflow tip terminating in an overflow vessel and a storage vessel having a connecting tube between said overflow vessel and said storage vessel and having a second connecting tube between said storage vessel and said measuring apparatus for filling said measuring apparatus, means for filling said measuring apparatus and causing overflowing of fluid through said overflow tip whereby a pressure difference between said overflow fluid level and the fluid level in said storage vessel is created sufficient to prevent overflowing to a level above the said tip and means during a second filling of said measuring apparatus to produce sufficient pressure difference between said overflow vessel and said storage vessel to force any overflow fluid from the first filling from said overflow vessel into said storage vessel.

4. A volumetric measuring apparatus comprising a storage vessel containing a reaction fluid, a measuring vessel and a connecting tube connecting the storage vessel and the lower portion of the measuring vessel, to fill the measuring vessel by gravity, said measuring vessel having at its upper end an overflow tip terminating into an overflow vessel and a connecting tube from the lower part of said overflow vessel to the upper part of said storage vessel and means for producing during the time when said measuring vessel is being filled with reaction fluid an air pressure difference between the fluid level in said overflow vessel and said storage vessel and whereby any overflow fluid in said overflow vessel is forced into said storage vessel.

5. A volumetric measuring apparatus comprising a storage vessel containing a reaction fluid and open to the atmosphere, a measuring vessel, a stop-cock and a tube connecting the storage vessel and the lower portion of the measuring vessel to fill the measuring vessel by gravity, said measuring vessel having at its upper end an overflow tip terminating into a closed overflow vessel having a liquid conducting tube connected between the lower portion of the overflow vessel and the upper portion of the storage vessel and said overflow vessel being of such size that filling of the measuring vessel with reaction fluid produces automatically a sufficient air pressure in said overflow vessel to force any overflow fluid contained in it into said storage vessel.

6. A volumetric measuring apparatus comprising a storage vessel containing a reaction fluid and being open to the atmosphere, a measuring vessel, a stop-cock and a tube connecting the storage vessel and the lower portion of the measuring vessel to fill the measuring vessel by gravity, said measuring vessel having at its upper end an overflow tip terminating in a closed overflow vessel having sealed into its lower part a tube connecting it to the upper part of the said storage vessel and said overflow vessel being of such size that overflowing of reaction fluid through said overflow tip produces automatically a sufficient air pressure in said overflow vessel that the overflow stops while said overflow tip is still above the fluid level in said overflow vessel.

7. A volumetric measuring apparatus comprising a storage vessel containing a fluid to be measured and open to the atmosphere, a measuring vessel, a stop-cock and a tube connecting the storage vessel and the lower portion of the measuring vessel to fill the measuring vessel by gravity, said measuring vessel having at its upper end an overflow tip terminating in a closed overflow vessel having sealed into its lower part a tube connecting it to the upper part of the said storage vessel and said overflow vessel being of such size that filling of the measuring vessel with fluid produces automatically a sufficient air pressure in said overflow vessel to force any overflow fluid contained in it into said storage vessel and after said measuring vessel is filled that overflowing of fluid through said overflow tip produces automatically a sufficient air pressure in said overflow vessel that the overflow stops while said overflow tip is still above the fluid level in said overflow vessel.

8. A volumetric measuring apparatus comprising a storage vessel containing a solution to be measured and being closed to the atmosphere, a measuring vessel, a connecting tube and a stop-cock for filling said measuring vessel by gravity, said measuring vessel having at its upper end an overflow tip terminating in an overflow vessel open to the atmosphere and having sealed into its lower part a tube connecting it to the upper part of the said storage vessel and said storage vessel being of such size that filling of said measuring vessel with solution produces automatically a sufficient pressure reduction in said storage vessel to force any overflow solution contained in said overflow vessel into said storage vessel.

9. A volumetric measuring apparatus comprising a storage vessel containing a solution to be measured out and being closed to the atmosphere, a measuring vessel, a connecting tube and a stop-cock for filling said measuring vessel by gravity, said measuring vessel having at its upper end an overflow tip terminating in an overflow vessel open to the atmosphere and having sealed into its lower part a tube connecting it to the upper part of the said storage vessel and said storage vessel being of such size that after filling of said measuring vessel overflowing of solution through said overflow tip produces automatically a sufficient pressure decrease in said storage vessel that the overflow stops while said overflow tip is still above the fluid level in said overflow vessel.

10. A volumetric measuring apparatus comprising a storage vessel containing a solution to be measured and being closed to the atmosphere, a measuring vessel, a stop-cock and a tube connecting the storage vessel and the lower portion of the measuring vessel to fill the measuring vessel by gravity, said measuring vessel having at its upper end an overflow tip terminating in an overflow vessel open to the atmosphere and having sealed into its lower part a tube connecting it to the upper part of the said storage vessel and said storage vessel being of such size that filling of said measuring vessel with solution produces automatically a sufficient pressure reduction above the level of the solution in said storage vessel to force any overflow solution contained in said overflow vessel into said storage vessel and after filling of said measuring vessel that overflowing of solution through said overflow tip produces automatically a sufficient pressure decrease in the air above the level of the solution in said storage vessel that the overflow stops while said overflow tip is still above the fluid level in said overflow vessel.

OTTO HOPF.
FREDERICK A. WENMAN.